(12) United States Patent
Bacon et al.

(10) Patent No.: US 10,946,780 B2
(45) Date of Patent: Mar. 16, 2021

(54) LOCKING ROTATABLE HANDRAIL FOR STAIRS

(71) Applicants: Bruce Bacon, Rockford, MI (US); Charles A. Brammer, Traverse City, MI (US)

(72) Inventors: Bruce Bacon, Rockford, MI (US); Charles A. Brammer, Traverse City, MI (US)

(73) Assignee: Stromberg Carlson Products, Inc., Traverse (ML)

( * ) Notice: Subject to any disclaimer, the term of this patent is extended or adjusted under 35 U.S.C. 154(b) by 55 days.

(21) Appl. No.: 16/287,462

(22) Filed: Feb. 27, 2019

(65) Prior Publication Data
US 2020/0269739 A1    Aug. 27, 2020

(51) Int. Cl.
*B60N 3/02* (2006.01)
*B60P 3/32* (2006.01)
*E05B 73/00* (2006.01)

(52) U.S. Cl.
CPC .............. *B60N 3/023* (2013.01); *B60P 3/32* (2013.01); *E05B 73/00* (2013.01)

(58) Field of Classification Search
CPC ............. B60N 3/023; B60P 3/32; E05B 73/00
See application file for complete search history.

(56) References Cited

U.S. PATENT DOCUMENTS

| | | | |
|---|---|---|---|
| 3,912,298 A | 10/1975 | Humphrey | |
| 3,997,211 A | 12/1976 | Graves | |
| 4,664,227 A | 5/1987 | Hansen | |
| 4,720,116 A | 1/1988 | Williams et al. | |
| 4,976,455 A | 12/1990 | Brammer, Sr. et al. | |
| 5,116,025 A * | 5/1992 | Kiniry | E04F 11/18 256/67 |
| 6,237,988 B1 * | 5/2001 | Messano | B60P 3/34 296/165 |
| 6,394,307 B1 * | 5/2002 | Andrews | B60P 3/36 221/186 |
| 6,425,625 B1 * | 7/2002 | Messano | B60P 3/34 296/156 |
| 6,843,468 B2 * | 1/2005 | Marshall | A47K 3/003 248/205.1 |
| 7,007,366 B1 * | 3/2006 | Eby | B60P 3/36 29/434 |
| 7,249,395 B2 | 7/2007 | Brammer, Jr. et al. | |
| 10,457,182 B2 * | 10/2019 | McKinnon | B60N 3/026 |
| 2002/0125736 A1 * | 9/2002 | Messano | B60P 3/34 296/165 |
| 2008/0088146 A1 * | 4/2008 | Newman | B60P 3/0252 296/26.15 |

* cited by examiner

*Primary Examiner* — Lori L Lyjak
(74) *Attorney, Agent, or Firm* — Flynn Thiel, P.C.

(57) ABSTRACT

A handrail assembly comprising a top bracket and a handrail pivotally connected to the top bracket. The handrail is movable relative to the top bracket between a stowed position and a deployed position. The handrail is able to be locked in position. The handrail can move between the stowed position and the deployed position when the handrail is not locked in position, but held in the stowed position or the deployed position when the handrail is not locked in position. The handrail cannot move between the stowed position and the deployed position when the handrail is locked in position.

21 Claims, 10 Drawing Sheets

LOCKING ROTATABLE HANDRAIL FOR STAIRS

FIELD OF THE INVENTION

The present invention relates to hand rails, and in particular to locking hand rails.

BACKGROUND OF THE INVENTION

Many recreational vehicles and vessels provide a series of steps and an associated hand bracket along their outer surfaces to accommodate easy access thereto.

However, due to the mobility of the vehicle or the like, the hand bracket can be adjustably constructed to avoid interference with the desired travel. One common approach is to detachably secure the hand bracket to the vehicle so that it may be removed for travel. An example of such a construction is disclosed in U.S. Pat. No. 4,664,227 entitled PORTABLE BALUSTRADE AND PLATFORM ASSEMBLY. However, while such arrangements avoid travel interference, they involve labor-intensive and time-consuming operations to attach and detach, and therefore often become a nuisance to the user. Furthermore, suitable and easily-accessible storage space must be provided for receiving the hand bracket during travel. Also, the various fasteners utilized to assemble and attach the hand bracket must be kept track of to ensure that they will not become lost or erroneously used in the subsequent erection and attachment of the hand bracket. This problem is especially acute if the hand bracket is to be stored for a long duration before reassembling.

In an effort to alleviate these difficulties, past artisans have also developed collapsible hand brackets, such as disclosed in: U.S. Pat. No. 4,720,116 entitled STORABLE STAIRWAY AND PLATFORM APPARATUS FOR RECREATIONAL VEHICLES; U.S. Pat. No. 3,997,211 entitled RETRACTABLE PATIO ASSEMBLY FOR USE ON A PICKUP TRUCK MOUNTED CAMPER OR THE LIKE; and U.S. Pat. No. 3,912,298 entitled FOLDABLE STEPS FOR MOBILE HOME. However, these hand brackets typically involve a plurality of pivotally interconnected segments which cooperate to effect collapse of the hand bracket against the vehicle in a vertical plane or elements which fold against an enlarged horizontal porch section before collapsing against the side of the vehicle. These arrangements greatly increase the complexity of the hand bracket and invariably increase the cost of fabrication and the susceptibility to disrepair. Further examples of retractable hand rails include those of U.S. Pat. No. 4,976,455 entitled HANDRAIL and U.S. Pat. No. 7,249,395 entitled HAND BRACKET.

Accordingly, an apparatus is desired having the aforementioned advantages and solving and/or making improvements on the aforementioned disadvantages.

SUMMARY OF THE INVENTION

The present invention, according to one aspect, is directed to a handrail assembly comprising a top bracket, a bottom bracket, and a handrail connected to the top bracket and the bottom bracket. The handrail is movable relative to the top bracket and the bottom bracket between a stowed position and a deployed position. The handrail is able to be locked in position. The handrail can move between the stowed position and the deployed position when the handrail is not locked in position, but held in the stowed position or the deployed position when the handrail is not locked in position. The handrail cannot move between the stowed position and the deployed position when the handrail is locked in position.

Another aspect of the present invention is to provide a handrail assembly comprising a top bracket and a handrail pivotally connected to the top bracket. The handrail is movable relative to the top bracket between a stowed position and a deployed position, the stowed position being substantially perpendicular relative to the deployed position. The handrail is able to be locked in position. The handrail can move between the stowed position and the deployed position when the handrail is not locked in position, but biased and held in the stowed position or the deployed position when the handrail is not locked in position. The handrail cannot move between the stowed position and the deployed position when the handrail is locked in position.

Yet another aspect of the present invention is to provide a recreational vehicle comprising a side wall of the vehicle, a door located in the side wall of the vehicle, and a handrail assembly connected to the side wall adjacent the door. The handrail assembly comprises a top bracket connected to the side wall, a bottom bracket connected to the side wall, and a handrail connected to the top bracket and the bottom bracket. The handrail is movable relative to the top bracket and the bottom bracket between a stowed position and a deployed position. The handrail is able to be locked in the stowed position or the deployed position. The handrail can move between the stowed position and the deployed position when the handrail is not locked in position, but held in the stowed position or the deployed position when the handrail is not locked in position. The handrail cannot move between the stowed position and the deployed position when the handrail is locked in position.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

The specific devices and processes illustrated in the attached drawings and described in the following specification are simply exemplary embodiments of the inventive concepts. Hence, specific dimensions and other physical characteristics relating to the embodiments disclosed herein are not to be considered as limiting.

DETAILED DESCRIPTION

For purposes of description herein, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
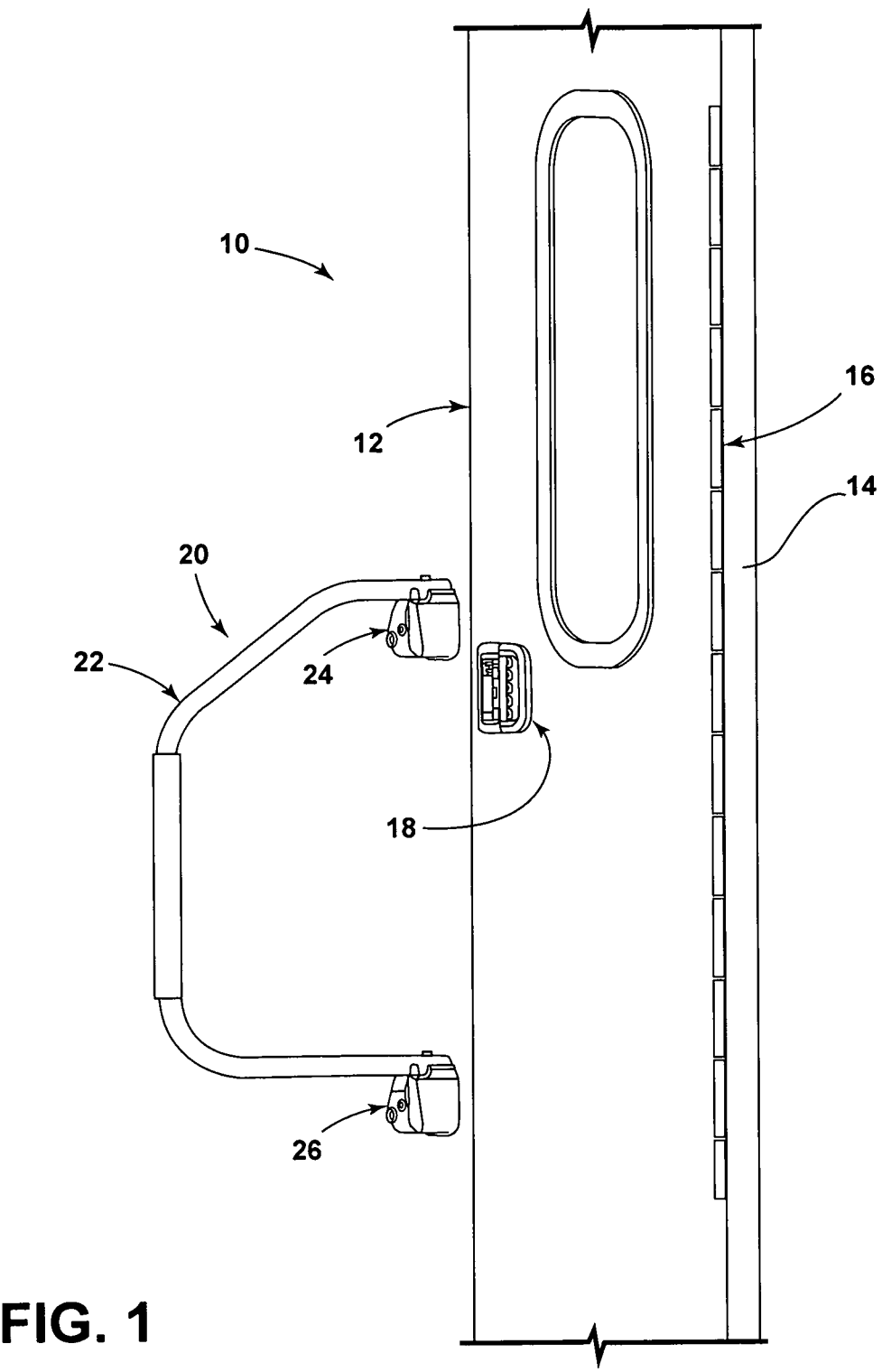
FIG. 1 is a perspective view of a recreational vehicle having a handrail of a handrail assembly of the present invention in a deployed position.
Figure 2:
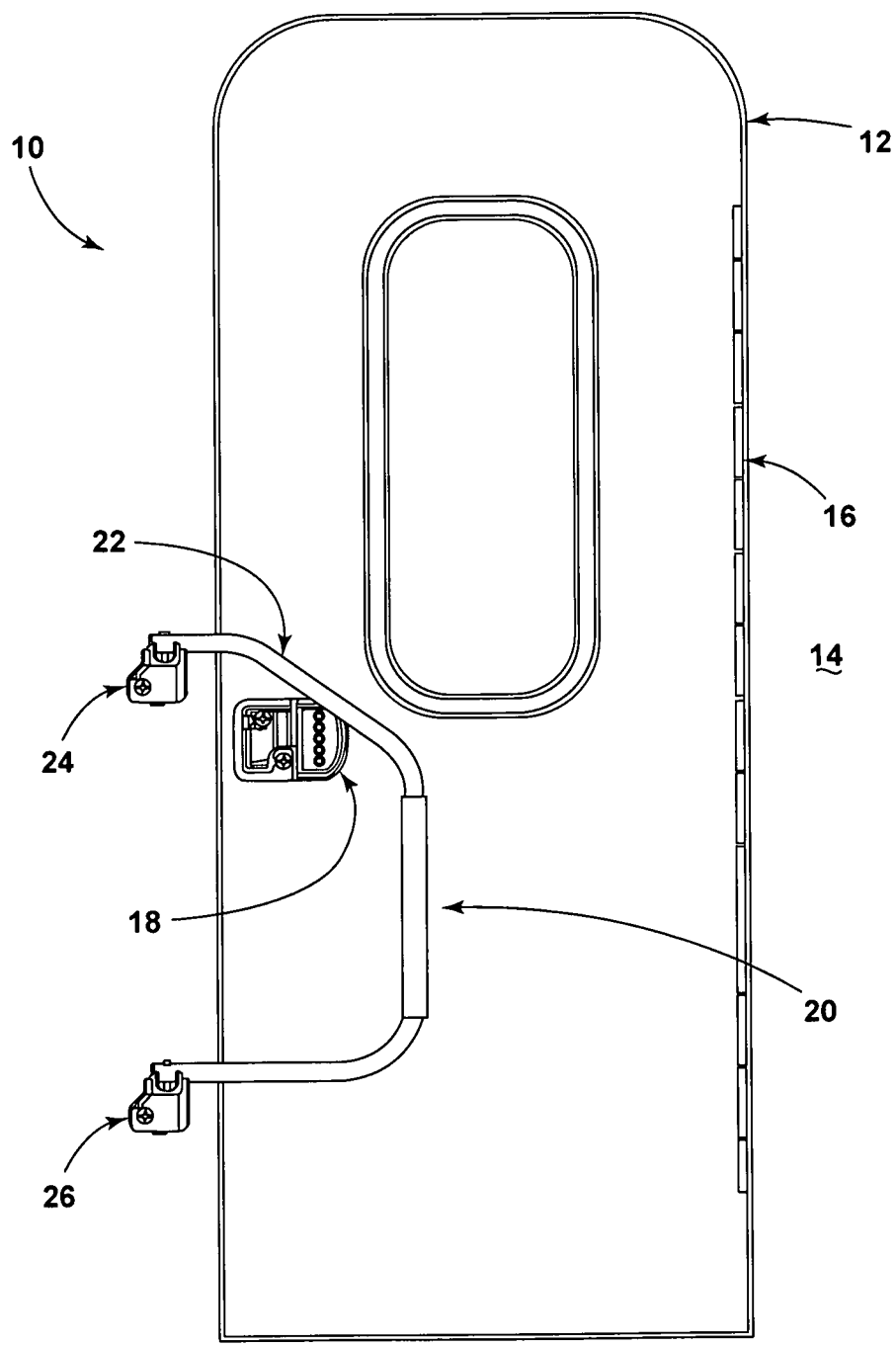
FIG. 2 is a front view of the recreational vehicle having the handrail of the handrail assembly of the present invention in a stowed position.

The reference number 10 (FIGS. 1-2) generally designates a door assembly for a recreational vehicle. The door assembly 10 includes a door 12 that is hingedly connected to a body 14 of the recreational vehicle by a hinge 16. The door 12 can be opened and pivoted about the hinge 16 by actuation of a door latch 18 in the door 12. Although not shown, stairs (e.g., retractable or movable) are positioned below the door 12 for allowing a person to step up to the door 12 for entering the recreational vehicle or for stepping down to leave the recreational vehicle. As shown in FIGS. 1-2, the door assembly 10 can include a handrail assembly 20 connected to the body 14 of the recreational vehicle adjacent the door 12 on a side thereof opposite the hinge 16. The handrail assembly 20 provides a hand support for a person entering or leaving the recreational vehicle through the door 12. The handrail assembly 20 can be located in a deployed position as shown in FIG. 1 wherein a handrail 22 of the handrail assembly 20 is positioned substantially perpendicularly to the body 14 of the recreational vehicle and a stowed position as shown in FIG. 2 wherein the handrail 22 of the handrail assembly 20 is positioned substantially parallel to the body 14 of the recreational vehicle. While the handrail 22 of the handrail assembly 20 is illustrated in FIG. 2 as covering the door 12 in the stowed position, the handrail 22 could have a stowed position that is located 180° to that shown in FIG. 2. It is contemplated that the handrail 22 could have only the stowed position as shown in FIG. 2, only the stowed position that is located 180° to that shown in FIG. 2, or could be able to be in either of these two stowed positions.

The illustrated handrail assembly 20 (FIGS. 1-2) allows for the handrail 22 to be moved between the deployed position and the stowed position (or one of the stowed positions) and selectively locked into the deployed or stowed position. The handrail assembly 20 includes an upper handrail mount bracket 24 and a lower handrail mount bracket 26. It is contemplated that at least one of the upper handrail mount bracket 24 and the lower handrail mount bracket 26 is lockable to allow the handrail 22 to be locked into the deployed or stowed position. While the upper handrail mount bracket 24 and the lower handrail mount bracket 26 are illustrated as being identical, the upper handrail mount bracket 24 and the lower handrail mount bracket 26 could be different, with only one of the upper handrail mount bracket 24 and the lower handrail mount bracket 26 being able to lock the handrail 22 in position. For example, one of the upper handrail mount bracket 24 and the lower handrail mount bracket 26 can be the lockable mount bracket as described herein and the other mount bracket can be a mount bracket that is not lockable. Examples of non-lockable mount brackets include those disclosed in U.S. Pat. No. 7,249,395 entitled HAND BRACKET and in U.S. Pat. No. 4,976,455 entitled HANDRAIL, the entire discloses of which are hereby incorporated herein by reference.

As outlined above, either or both of the upper handrail mount bracket 24 and the lower handrail mount bracket 26 can be lockable to lock the handrail 22 in position. The upper handrail mount bracket 24 will be disclosed herein, with the understanding that the lower handrail mount bracket 26 could be identical to the upper handrail mount bracket 24. In the illustrated example, the upper handrail mount bracket 24 (FIG. 3) includes a mount 28, a mount shell 30, a clutch adapter 32, a lock bolt 34 and a rear plate 36. As discussed in more detail below, the handrail 22 is received in the upper handrail mount bracket 24 and is fastened thereto by a pivot pin 38.

Figure 4:
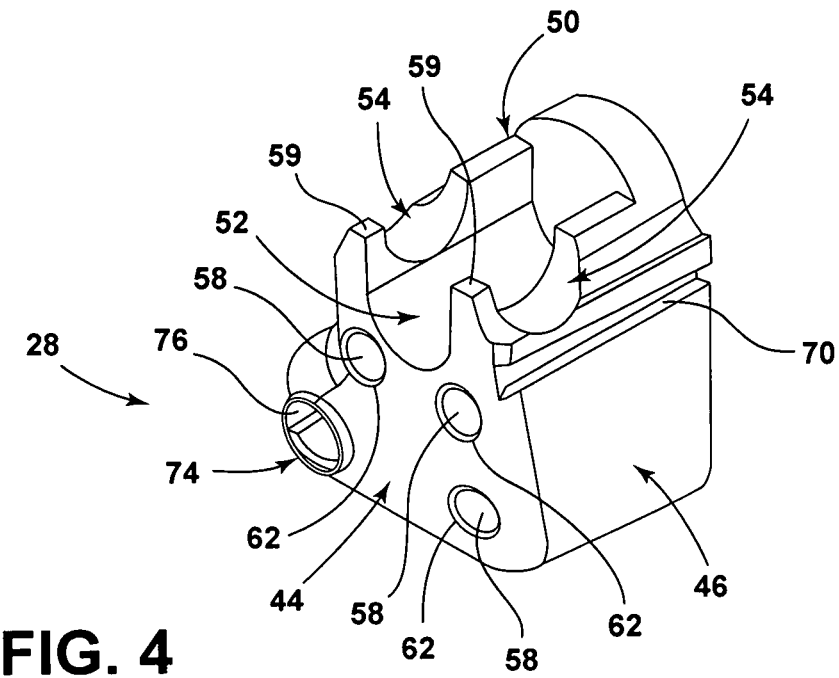
FIG. 4 is a perspective view of a mount of the hand bracket of the present invention.
Figure 5:
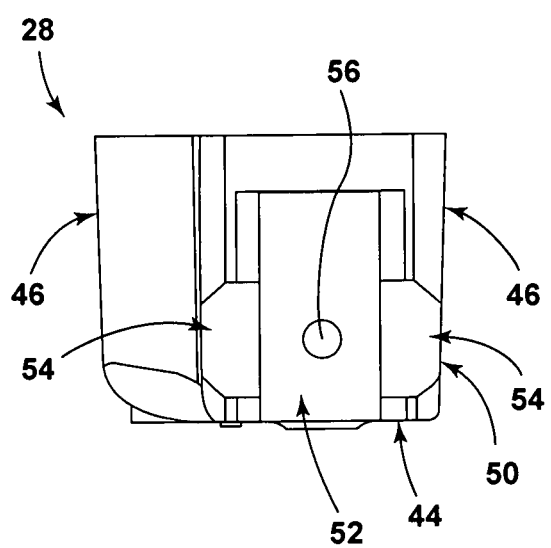
FIG. 5 is a top view of the mount of the hand bracket of the present invention.
Figure 6:
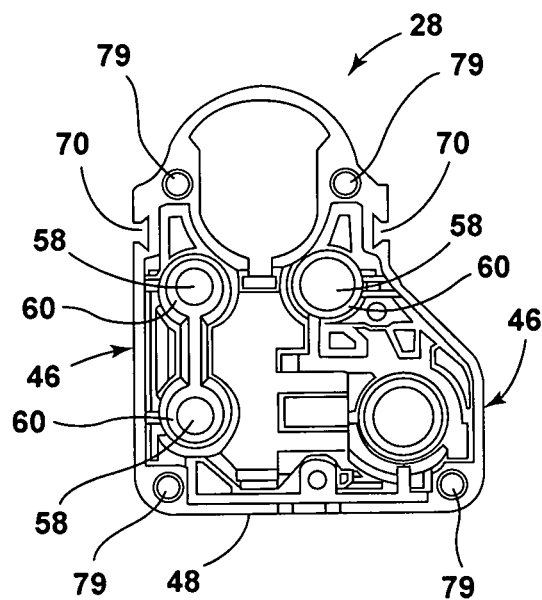
FIG. 6 is a rear view of the mount of the hand bracket of the present invention.

In the illustrated example, the mount 28 (FIGS. 4-6) is configured to support a substantially horizontal portion 42 of the handrail 22. The mount 28 includes a front face 44, a pair of opposite side faces 46, a bottom face 48 and an upper receiving area 50. The upper receiving area 50 includes a lower slot 52 for selectively accepting the horizontal portion 42 of the handrail 22 in the deployed position. The upper receiving area 50 of the mount 28 further includes a pair of top higher stowing grooves 54 for selectively accepting the horizonal portion 42 of the handrail 22 in the stowed position. The mount 28 can be connected to the body 14 of the recreational vehicle in any manner. In the illustrated example, the mount 28 includes a plurality of openings 58 that lead to fastener cylinders 60 that extend rearwardly from an interior of the front face 44 as shown in FIG. 6. Fasteners (not shown) extending into the openings 58, through the fastener cylinders 60 and into the body 14 of the recreational vehicle to connect the mount 28 and thereby the upper handrail mount bracket 24 to the body 14 of the recreational vehicle. The front face 44 includes fastener head recesses 62 that surround the openings 58 for preventing the heads of fasteners from entering the openings 58. The mount 28 also includes additional mounting holes 79 for connecting the mount 28 to the body 14 of the recreational vehicle which can be used in addition to or in lieu of the openings 58 for accepting fasteners for connecting the mount 28 to the recreational vehicle.

The illustrated horizontal portion 42 of the handrail 22 is pivotally connected to the mount 28 by the pivot pin 38. A bottom of the surface of the lower slot 52 includes a pin opening 56 (see FIG. 5). As discussed in more detail below (see FIGS. 13-15), the pivot pin 38 is able to slide vertically in through the pin opening 56 and is biased by a spring 200 downward to the surface of the lower slot 52. Therefore, the spring 200 holds the horizontal portion 42 of the handrail 22 in the lower slot 52 and therefore the deployed position. When unlocked, the handrail 22 can be lifted vertically above a front lip 59 of each of the top higher stowing grooves 54 and rotated 90° to be located above one of the top higher stowing grooves 54. Once the handrail 22 is released, the horizontal portion 42 of the handrail 22 is biased by the spring 200 into one of the top higher stowing grooves 54 and held therein in the stowed position.

Figure 3:
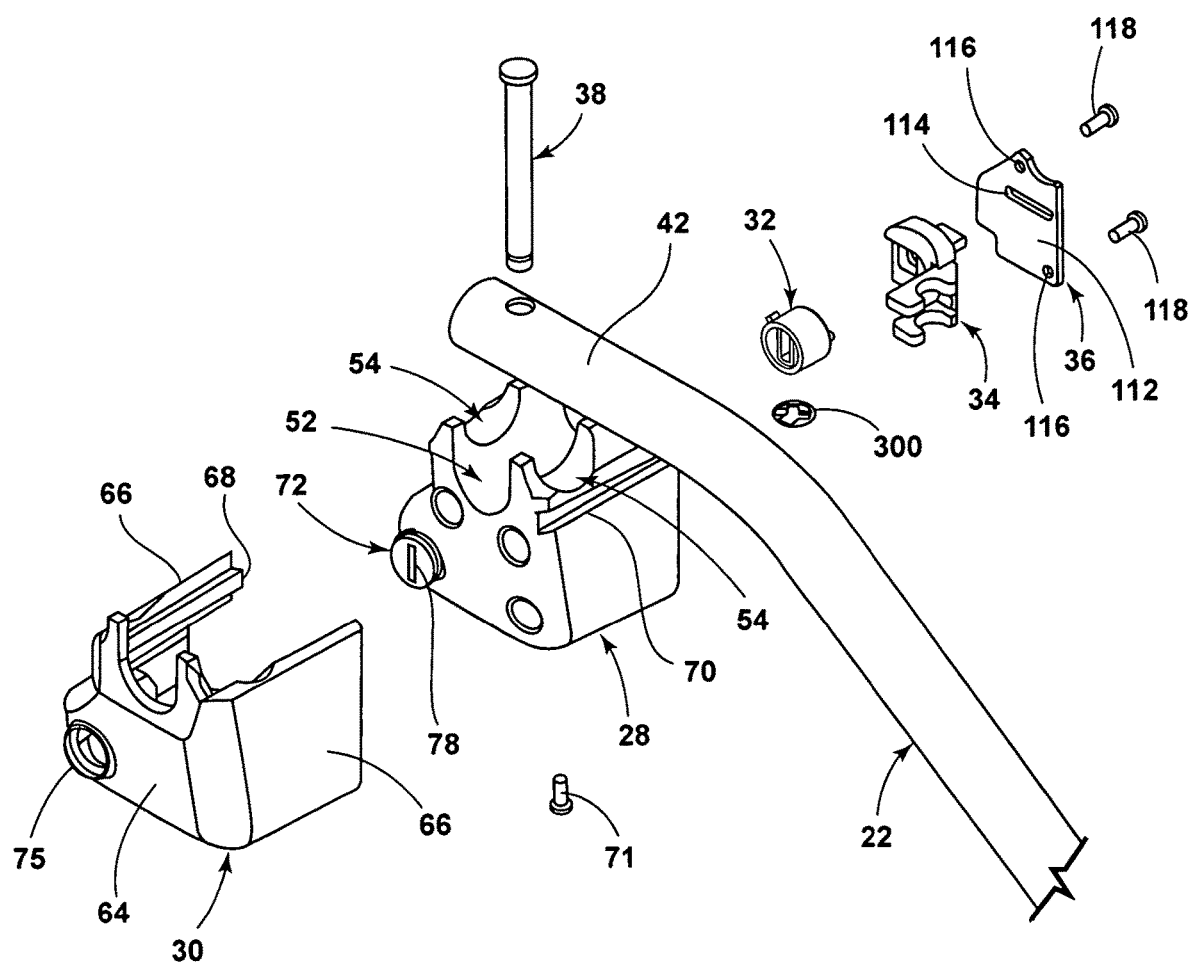
FIG. 3 is an exploded perspective view of a top portion of the handrail assembly of the present invention.
Figure 13:
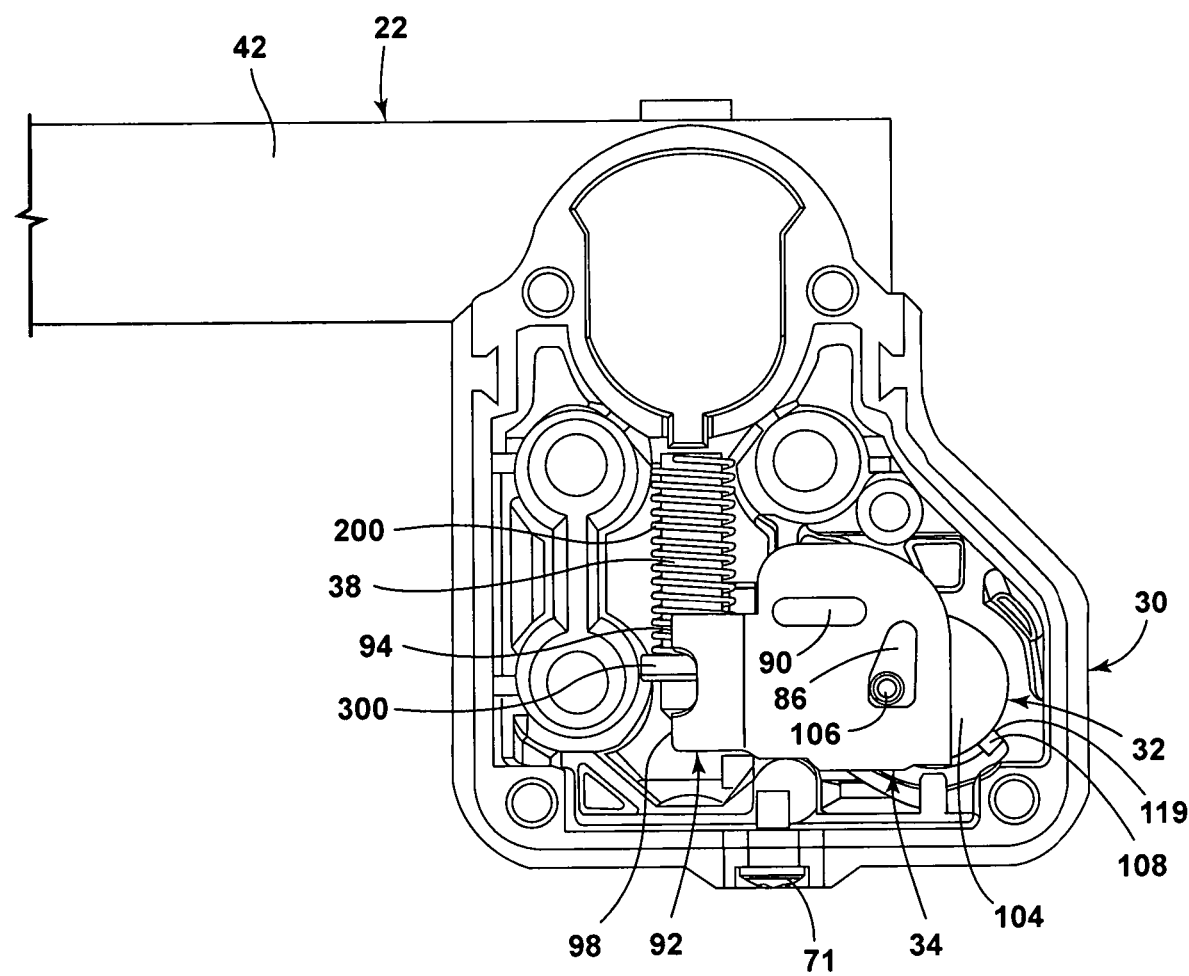
FIG. 13 is a rear view of the handrail assembly of the present invention without a rear plate and in the locked and stowed position.
Figure 14:
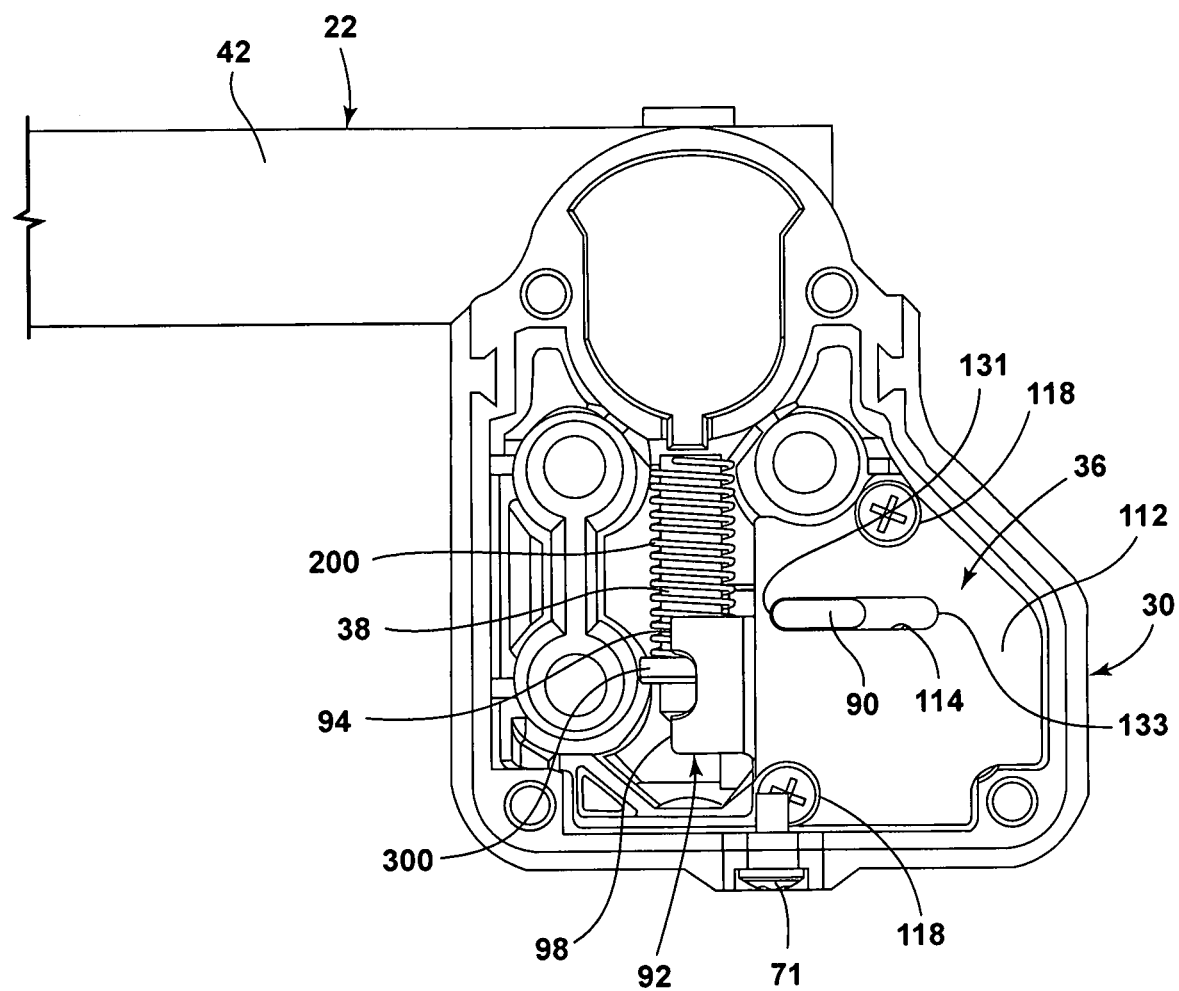
FIG. 14 is a rear view of the handrail assembly of the present invention in the locked and stowed position.
Figure 15:
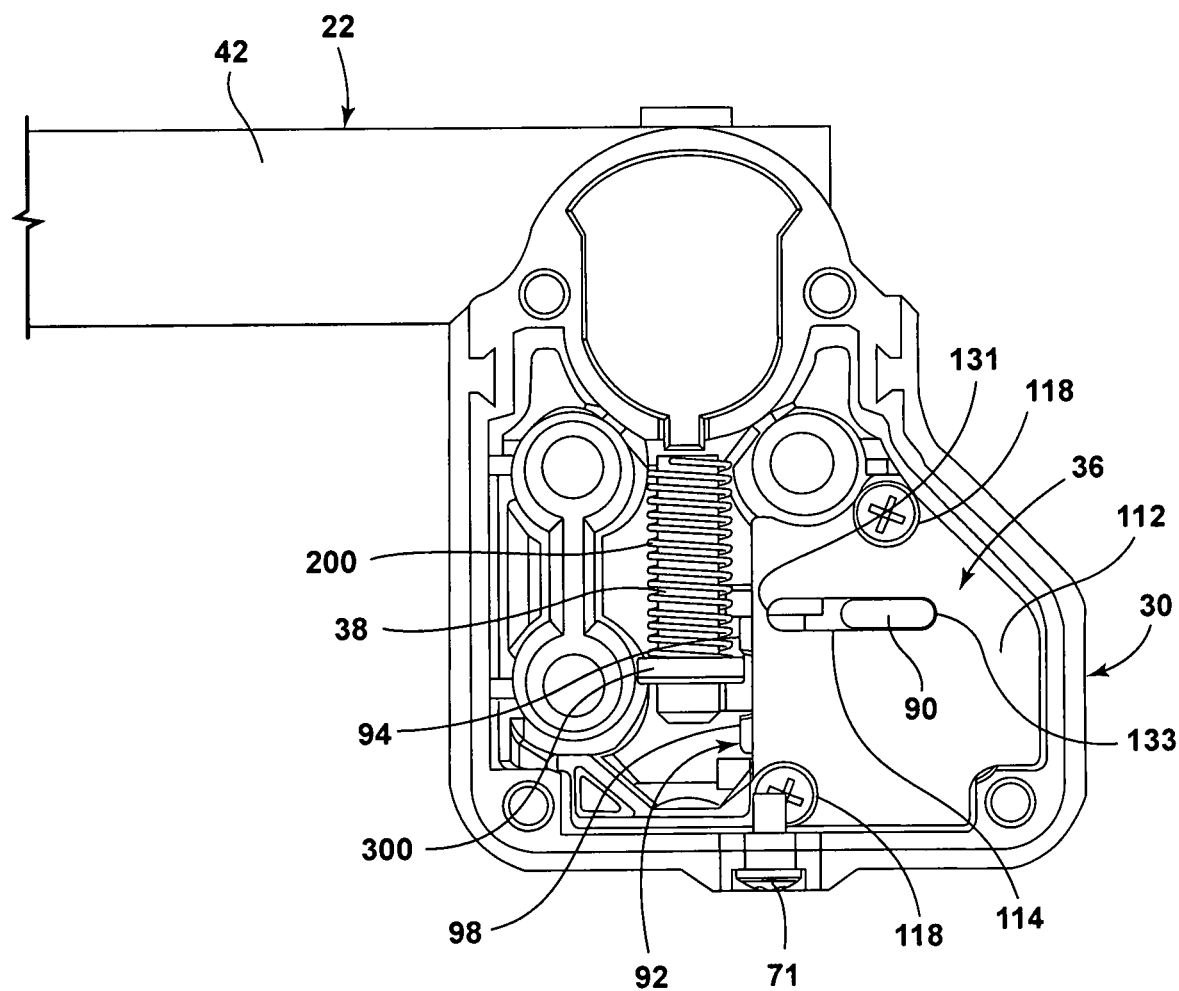
FIG. 15 is a rear view of the handrail assembly of the present invention in the unlocked and stowed position.

In the illustrated example, the mount shell 30 covers most of the front face 44, the side faces 46 and the bottom face 48 of the mount 28. The mount shell 30 includes front plate 64, a pair of side plates 66 and a bottom plate (not shown). It is contemplated that the mount shell 30 could be fixed to the mount 28 in any manner. In the illustrated embodiment, interior surfaces of the side plates 66 of the mount shell 30 have inwardly extending rails 68 which are slid into corresponding channels 70 in the side faces 46 of the mount 28. Once fully slid onto the mount 28, the mount shell 30 can be snap fit into position using corresponding ledges on the mount 28 and the mount shell 30 or can be fixed using other mechanical means (e.g., a pin 71 as shown in FIG. 3 that is inserted through the bottom plate of the mount shell 30 and into the bottom face 48 of the mount 28 as shown in FIGS. 13-15). Once the mount shell 30 is installed onto the mount 28, the fasteners extending through the mount 28 and into the recreational vehicle are hidden from view.

The illustrated handrail 22 is configured to be locked into the deployed or stowed position. The mount 28 of the upper handrail mount bracket 24 includes a lock cylinder 72 that extends through a hole 74 in the front face 44 of the mount 28. The lock cylinder 72 includes an outer cylinder that has projections that are received in slots 76 in the hole 74 to prevent the outer cylinder from rotating relative to the mount 28 as is well known to those skilled in the art. As is also well known to those skilled in the art, the lock cylinder 72 includes a key opening 78 for receiving a key for allowing the inner cylinder of the lock cylinder 72 to rotate relative to the outer cylinder. As shown in FIG. 3, the mount shell 30 includes an aperture 75 in the front plate 64 thereof allowing access to the key opening 78 when the mount shell 30 is mounted to the mount 28.

In the illustrated example, the clutch adapter 32, the lock bolt 34 and the rear plate 36 of the upper handrail mount bracket 24 work together to selectively lock the handrail 22 in the deployed or stowed position when the lock cylinder 72 is locked and allows the handrail 22 to move between the deployed position and one of the stowed positions when the lock cylinder 72 is unlocked. The illustrated lock bolt 34 selectively engages with the pivot pin 38 to prevent upward moving of the pivot pin 38 and thereby the handrail 22 to lock the handrail 22 in the deployed or stowed position. The rear plate 36 limits the range of movement of the lock bolt 34 between a position engaged with the pivot pin 38 and disengaged from the pivot pin 38. The clutch adapter 32 transfers movement of the lock cylinder 72 to the lock bolt 34 to move the lock bolt 34 between the engaged position and the disengaged position.

Figure 7:
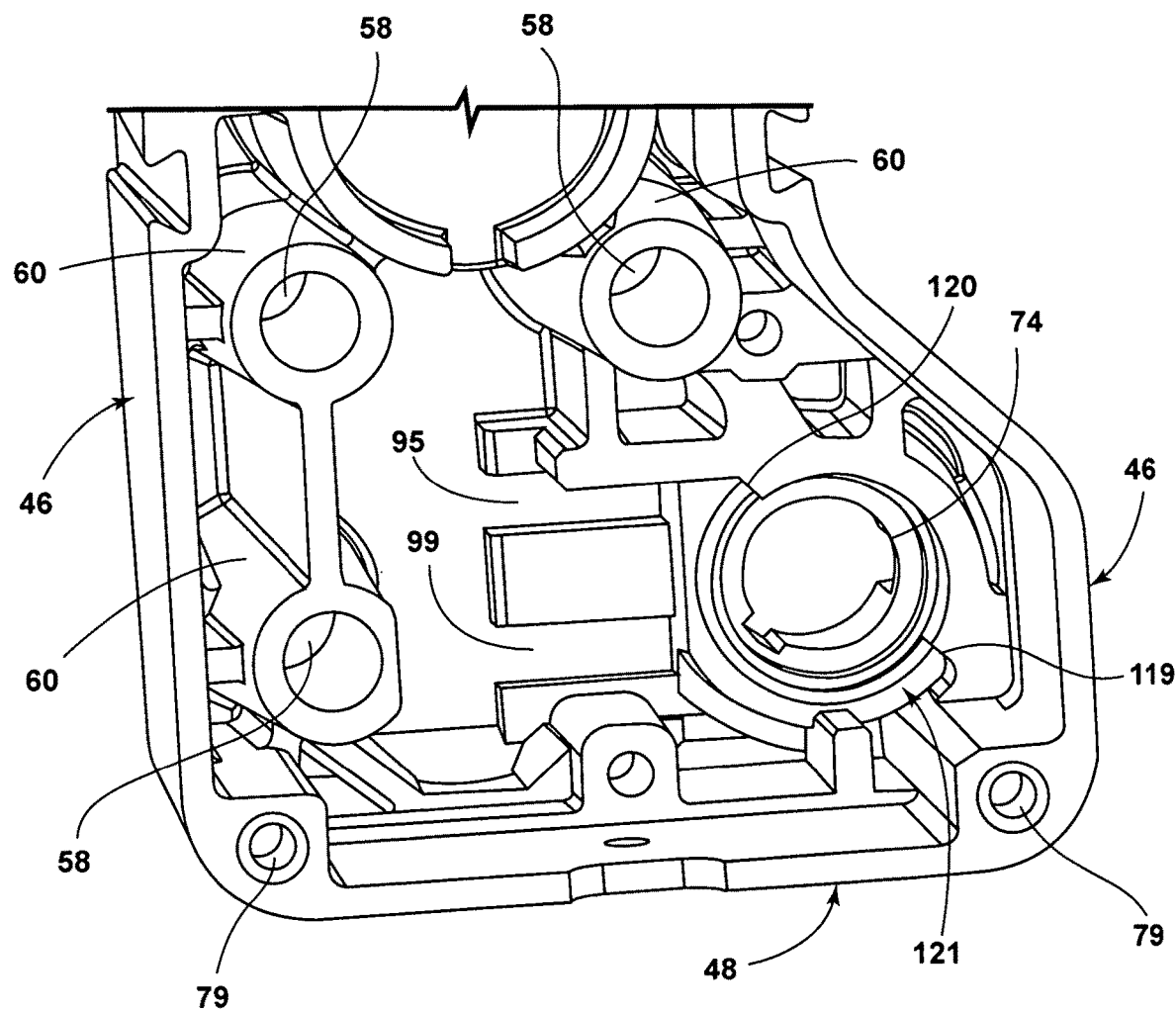
FIG. 7 is a perspective rear view of the mount of the hand bracket of the present invention.
Figure 8:
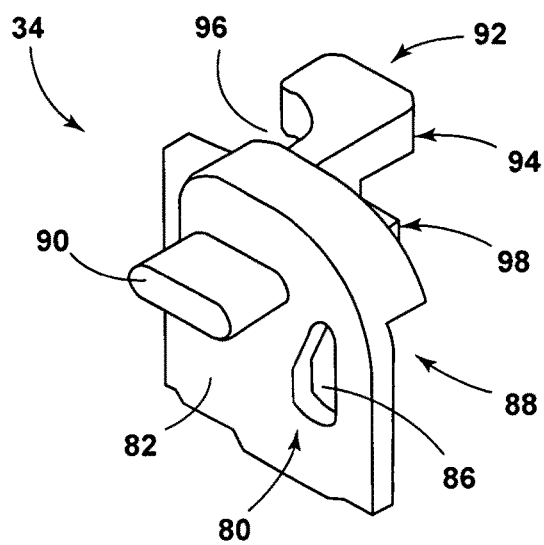
FIG. 8 is a perspective view of a lock bolt of the hand bracket of the present invention.
Figure 9:
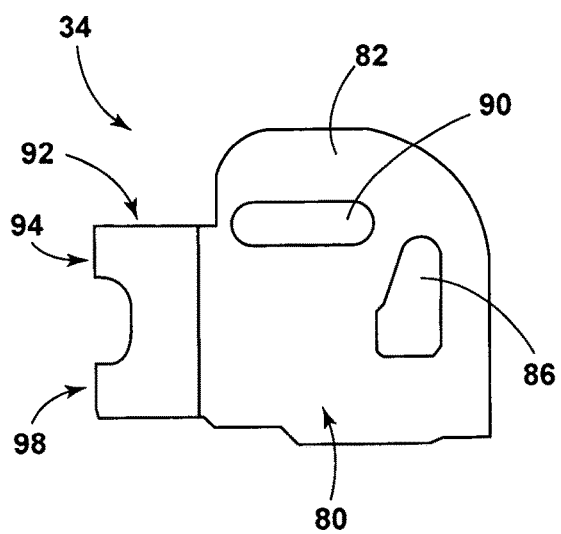
FIG. 9 is a front view of the lock bolt of the hand bracket of the present invention.
Figure 10:
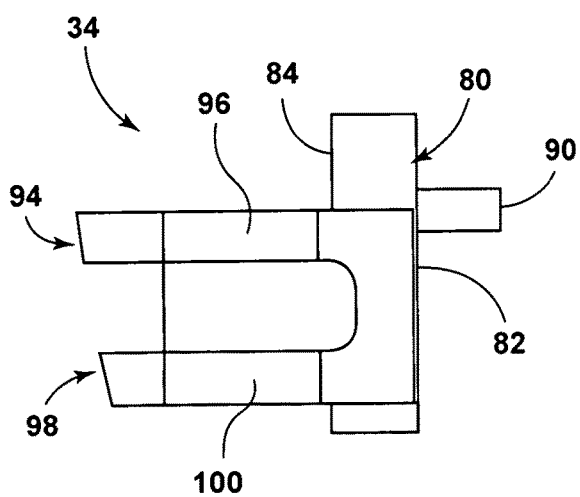
FIG. 10 is a top view of the lock bolt of the hand bracket of the present invention.

The illustrated lock bolt 34 (FIGS. 8-10) slides within the mount 28 between the locked and unlocked position. The lock bolt 34 includes a main plate 80 and a lock fin 92. The main plate 80 includes a front side 82 and a rear side 84 with a clutch pin receiving opening 86 extending from the front side 82 to the rear side 84. A clutch recess 88 is located in the rear side 84 of the main plate 80 to receive a portion of the clutch adapter 32 therein as described in more detail below (see FIGS. 14-15). A horizontal slide flange 90 extends from the front side 82 of the main plate 80 and aligns the lock bolt 34 as the lock bolt 34 slides between the locked and unlocked positions. The slide flange 90 also abuts ends 131, 133 of a slide opening 114 in the rear plate 36 to stop sliding movement of the lock bolt 34 as described in more detail below. The lock fin 92 includes an upper lock tooth 94 and a lower lock tooth 98. The upper lock tooth 94 includes an upper pin recess 96 and the lower lock tooth 98 includes a lower pin recess 100 that is aligned with the upper pin recess 96. As illustrated in FIG. 7, the mount 28 includes an upper slide channel 95 for receiving the upper lock tooth 94 and a lower slide channel 99 for receiving the lower lock tooth 98 to support the lock bolt 34 during movement thereof.

In the illustrated example, the lock fin 92 of the lock bolt 34 extends from a side of the main plate 80 and selectively engages with the pivot pin 38 to prevent movement of the handrail 22. FIGS. 13 and 14 illustrate the lock bolt 34 in the locked position. In the locked position, the pivot pin 38 and spring 200 are located in the upper pin recess 96 of the upper lock tooth 94 and the lower pin recess 100 of the lower lock tooth 98 of the lock fin 92. Moreover, a retaining clip 300 connected to a bottom of the pivot pin 38 is located between the upper lock tooth 94 and the lower lock tooth 98, thereby preventing upward movement of the pivot pin 38. Since upward movement of the pivot pin 38 is prevented when the lock bolt 34 is in the locked position, the handrail 22 is prevented from moving upward to be moved between the deployed position and the stowed position. While a particular means of preventing the pivot pin 38 from moving with the lock bolt 34 is described herein, it is contemplated that the lock bolt 34 could interact with the pivot pin 38 or portion thereof (or connected thereto) to prevent the pivot pin 38 from moving (e.g., the lock bolt 34 having a projection that extends into an opening in the pivot pin 38).

Figure 11:
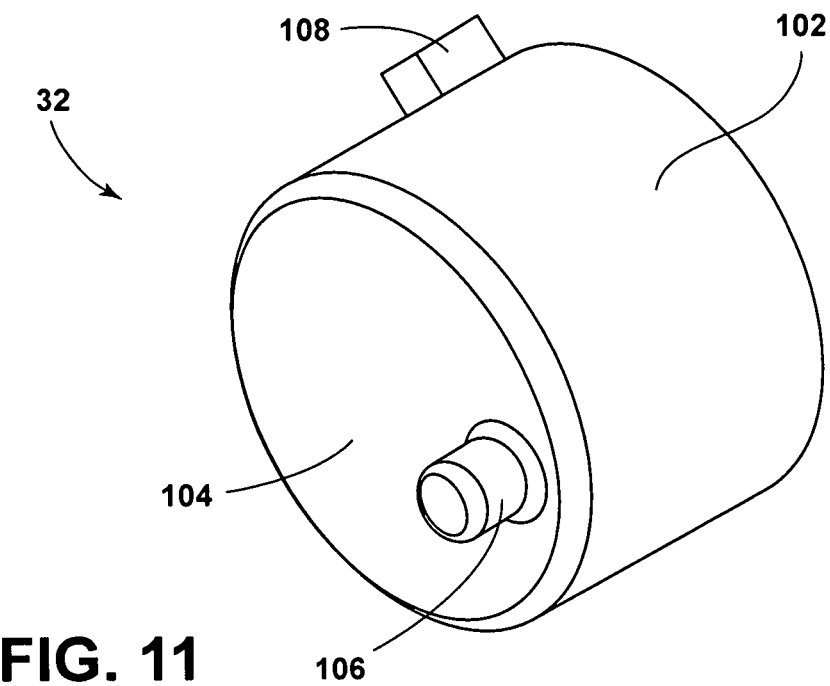
FIG. 11 is a front perspective view of a clutch adapter of the hand bracket of the present invention.
Figure 12:
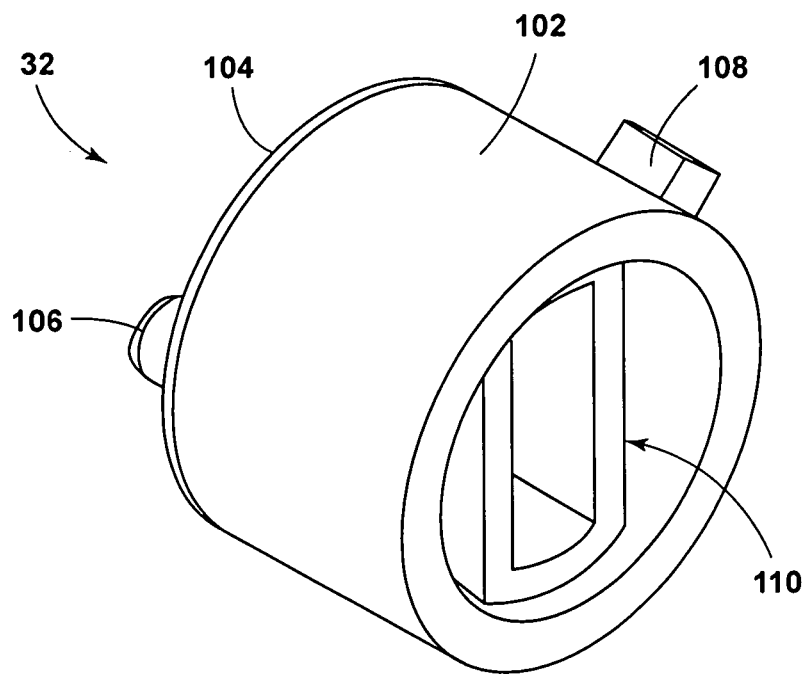
FIG. 12 is a rear perspective view of the clutch adapter of the hand bracket of the present invention.

The illustrated clutch adapter 32 (FIGS. 11-12) transmits rotational movement of the lock cylinder 72 to linear movement of the lock bolt 34 during rotational movement of the lock cylinder 72. The clutch adapter 32 includes a tube 102 having a closed end face 104. A pin 106 projects from the closed end face 104 of the tube 102. An interior of the tube 102 includes a receiver 110 for receiving a portion of the lock cylinder 72 (or possibly a key extending through the lock cylinder 72). During rotation of the key and the lock cylinder 72, the clutch adapter 32 is forced to rotate therewith through interaction of the receiver 110 and the portion of the lock cylinder 72 (or possibly a key extending through the lock cylinder 72). A circumferential outer face of the tube 102 includes a stop projection 108 extending therefrom. As illustrated in FIG. 7, the mount 28 includes an arcuate recess 121 for supporting the tube 102 of the clutch adapter 32 and allows for the clutch adapter 32 to rotate. The arcuate recess 121 includes a first stop 120 at a first end of the arcuate recess 121 that is configured to abut the stop projection 108 of the clutch adapter 32 to limit rotational movement of the clutch adapter 32 in the deployed position and a second stop 119 at a second end of the arcuate recess 121 that is configured to abut the stop projection 108 of the clutch adapter 32 to limit rotational movement of the clutch adapter 32 in the stowed position.

When the upper handrail mount bracket 24 is assembled, the clutch adapter 32 is positioned within the clutch recess 88 located in the rear side 84 of the main plate 80 of the lock bolt 34 and the pin 106 extending from the closed end face 104 of the tube 102 of the clutch adapter 32 extending into the clutch pin receiving opening 86 in the main plate 80 of the lock bolt 34 as shown in FIG. 13. Rotation of the clutch adapter 32 will cause the pin 106 to abut against sides of the clutch pin receiving opening 86 to move linearly between the locked position and the unlocked position. As shown in FIGS. 14 and 15, the rear plate 36 includes a panel 112 having the slide opening 114 therein. As shown in FIG. 14, the horizontal slide flange 90 is moved fully to the left in the slide opening 114 to abut against the end 131 of the slide opening 114 to position the lock bolt 34 in the locked position. FIG. 15 illustrates the horizontal slide flange 90 moved fully to the right in the slide opening 114 to abut against the end 133 of the slide opening 114 to position the lock bolt 34 in the unlocked position. Fasteners 118 can extend through holes 116 (see FIG. 3) and into the mount 28 to fix the rear plate 36 to the mount 28, which also fixes the lock bolt 34 and the clutch adapter 32 within the mount 28.

In the illustrated handrail assembly 20, the handrail 22 can be held in the deployed position or the stowed position by use of the pivot pin 38 and spring 200 and can also be positively locked and held in the deployed position or the stowed position through use of the handrail assembly 20. Therefore, the handrail assembly 20 does not have to lock to hold the handrail in either the deployed or stowed positions, but can be locked to prevent movement between the deployed and stowed positions. While the handrail assembly 20 is described herein as being connected to a recreational vehicle, it is contemplated that the handrail assembly 20 could be utilized adjacent any location that has steps or could use a handrail assembly (e.g., a shower). Moreover, while the clutch adapter 32 is described as being separate from the lock cylinder, the lock cylinder could itself include the pin 106 thereon to abut against sides of the clutch pin receiving opening 86 to move the lock bolt 34 linearly between the locked position and the unlocked position.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A handrail assembly comprising:
a top bracket;
a bottom bracket; and
a handrail connected to the top bracket and the bottom bracket;
the handrail being movable relative to the top bracket and the bottom bracket between a stowed position and a deployed position;
the handrail being able to be locked in position;
wherein the handrail can move between the stowed position and the deployed position when the handrail is not locked in position, but held in the stowed position or the deployed position when the handrail is not locked in position; and
wherein the handrail cannot move between the stowed position and the deployed position when the handrail is locked in position.

2. The handrail assembly of claim 1, wherein:
the handrail is biased into the deployed position and the stowed position when the handrail is not locked in position to hold the handrail in the stowed position or the deployed position.

3. The handrail assembly of claim 2, wherein:
a spring biases the handrail into the deployed position and the stowed position.

4. The handrail assembly of claim 1, wherein:
one or both of the top bracket and the bottom bracket includes a first slot for receiving the handrail into the deployed position and at least one second slot for receiving the handrail into the stowed position, the first slot being substantially perpendicular to the at least one second slot.

5. The handrail assembly of claim 4, wherein:
a spring biases the handrail into the first slot or the at least one second slot.

6. The handrail assembly of claim 5, wherein:
a pivot pin extends from the handrail and into at least one of the top bracket and the bottom bracket; and
the spring biases the pivot pin into the at least one of the top bracket and the bottom bracket.

7. The handrail assembly of claim 6, wherein:
a lock assembly engages with the pivot pin to prevent movement of the pivot pin relative to the at least one of the top bracket and the bottom bracket when the handrail is locked in position to prevent movement of the handrail; and
the lock assembly does not engage with the pivot pin to allow movement of the pivot pin relative to the at least one of the top bracket and the bottom bracket when the handrail is not locked in position to thereby allow movement of the handrail.

8. The handrail assembly of claim 7, wherein:
the lock assembly includes a lock cylinder configured to accept a key therein for moving the lock assembly between a locked condition wherein the lock assembly engages with the pivot pin and an unlocked condition wherein the lock assembly does not engage with the pivot pin.

9. The handrail assembly of claim 6, wherein:
the lock assembly includes a lock cylinder, a lock bolt that engages with the pivot pin and a clutch assembly that transmits movement of the lock cylinder to the lock bolt to move the lock bolt into a locked condition wherein the lock bolt engages with the pivot pin and an unlocked condition wherein the lock bolt does not engage with the pivot pin.

10. A handrail assembly comprising:
a top bracket;
a handrail pivotally connected to the top bracket;
the handrail being movable relative to the top bracket between a stowed position and a deployed position, the stowed position being substantially perpendicular relative to the deployed position;
the handrail being able to be locked in position;
wherein the handrail can move between the stowed position and the deployed position when the handrail is not locked in position, but biased and held in the stowed position or the deployed position when the handrail is not locked in position; and
wherein the handrail cannot move between the stowed position and the deployed position when the handrail is locked in position.

11. The handrail assembly of claim 10, wherein:
a spring biases the handrail into the deployed position and the stowed position.

12. The handrail assembly of claim 10, wherein:
the top bracket includes a first slot for receiving the handrail into the deployed position and at least one second slot for receiving the handrail into the stowed position, the first slot being substantially perpendicular to the at least one second slot.

13. The handrail assembly of claim 12, wherein:
a spring biases the handrail into the first slot or the at least one second slot.

14. The handrail assembly of claim 13, wherein:
a pivot pin extends from the handrail and into the top bracket; and
the spring biases the pivot pin into the top bracket.

15. The handrail assembly of claim 14, wherein:
a lock assembly engages with the pivot pin to prevent movement of the pivot pin relative to the top bracket when the handrail is locked in position to prevent movement of the handrail; and
the lock assembly does not engage with the pivot pin to allow movement of the pivot pin relative to the top bracket when the handrail is not locked in position to thereby allow movement of the handrail.

16. The handrail assembly of claim 15, wherein:
the lock assembly includes a lock cylinder configured to accept a key therein for moving the lock assembly between a locked condition wherein the lock assembly engages with the pivot pin and an unlocked condition wherein the lock assembly does not engage with the pivot pin.

17. The handrail assembly of claim 15, wherein:
the lock assembly includes a lock cylinder, a lock bolt that engages with the pivot pin and a clutch assembly that transmits movement of the lock cylinder to the lock bolt to move the lock bolt into a locked condition wherein the lock bolt engages with the pivot pin and an unlocked condition wherein the lock bolt does not engage with the pivot pin.

18. A recreational vehicle comprising:
a side wall of the vehicle;
a door located in the side wall of the vehicle; and
a handrail assembly connected to the side wall adjacent the door, the handrail assembly comprising a top bracket connected to the side wall, a bottom bracket connected to the side wall, and a handrail connected to the top bracket and the bottom bracket;
the handrail being movable relative to the top bracket and the bottom bracket between a stowed position and a deployed position;
the handrail being able to be locked in the stowed position or the deployed position;
wherein the handrail can move between the stowed position and the deployed position when the handrail is not locked in position, but held in the stowed position or the deployed position when the handrail is not locked in position; and
wherein the handrail cannot move between the stowed position and the deployed position when the handrail is locked in position.

19. The recreational vehicle of claim 18, wherein:
the handrail is biased by a spring into the deployed position and the stowed position when the handrail is not locked in position to hold the handrail in the stowed position or the deployed position; and
one or both of the top bracket and the bottom bracket includes a first slot for receiving the handrail into the deployed position and at least one second slot for receiving the handrail into the stowed position, the first slot being substantially perpendicular to the at least one second slot.

20. The recreational vehicle of claim 19, wherein:
a lock assembly engages with a pivot pin connected to the handrail to prevent movement of the pivot pin relative to the at least one of the top bracket and the bottom bracket when the handrail is locked in position to prevent movement of the handrail; and
the lock assembly does not engage with the pivot pin to allow movement of the pivot pin relative to the at least one of the top bracket and the bottom bracket when the handrail is not locked in position to thereby allow movement of the handrail.

21. The recreational vehicle of claim 20, wherein:
the lock assembly includes a lock cylinder, a lock bolt that engages with the pivot pin and a clutch assembly that transmits movement of the lock cylinder to the lock bolt to move the lock bolt into a locked condition wherein the lock bolt engages with the pivot pin and an unlocked condition wherein the lock bolt does not engage with the pivot pin.

\* \* \* \* \*

UNITED STATES PATENT AND TRADEMARK OFFICE
CERTIFICATE OF CORRECTION

PATENT NO. : 10,946,780 B2
APPLICATION NO. : 16/287462
DATED : March 16, 2021
INVENTOR(S) : Bruce Bacon et al.

It is certified that error appears in the above-identified patent and that said Letters Patent is hereby corrected as shown below:

On the Title Page

Item (73):
Change "Traverse (ML)" to --- Traverse City, MI (US) ---

Signed and Sealed this
Eleventh Day of May, 2021

Drew Hirshfeld
*Performing the Functions and Duties of the
Under Secretary of Commerce for Intellectual Property and
Director of the United States Patent and Trademark Office*